US006837913B2

(12) United States Patent
Schilling et al.

(10) Patent No.: US 6,837,913 B2
(45) Date of Patent: Jan. 4, 2005

(54) CYCLONE SEPARATOR

(75) Inventors: Horst Schilling, Köln (DE); Ralf Filges, Bergisch Gladbach (DE)

(73) Assignee: KHD Humbold Wedag, AG, Cologne (DE)

(*) Notice: Subject to any disclaimer, the term of this patent is extended or adjusted under 35 U.S.C. 154(b) by 133 days.

(21) Appl. No.: 10/396,744

(22) Filed: Mar. 25, 2003

(65) Prior Publication Data

US 2003/0188519 A1 Oct. 9, 2003

(30) Foreign Application Priority Data

Apr. 4, 2002 (DE) ........................................ 102 14 863

(51) Int. Cl.[7] ......................... B01D 45/12; B04C 5/085; F16L 9/22

(52) U.S. Cl. ........................ 55/435; 55/459.1; 138/107; 138/155

(58) Field of Search ................................ 55/337, 434.1, 55/434.2, 435, 459.1; 96/321; 138/107, 155; 209/721; 165/119; 210/512.1

(56) References Cited

U.S. PATENT DOCUMENTS

| | | | | |
|---|---|---|---|---|
| 3,470,678 A | * | 10/1969 | Schumacher et al. | 55/434.1 |
| 4,681,609 A | * | 7/1987 | Howeth | 55/302 |
| 4,961,761 A | * | 10/1990 | Johnson | 55/434.4 |
| 5,441,081 A | * | 8/1995 | Maury | 138/44 |
| 6,517,597 B2 | * | 2/2003 | Filges et al. | 55/435 |

FOREIGN PATENT DOCUMENTS

| | | |
|---|---|---|
| DE | 3228902 C2 | 2/1984 |
| DE | 198 25 206 A 1 | 12/1999 |

* cited by examiner

*Primary Examiner*—Frank M. Lawrence
(74) *Attorney, Agent, or Firm*—Charles L. Schwab; Nexsen Pruet

(57) ABSTRACT

A hot gas cyclone separator is provided with a segmented dip tube whose smooth sheet metal dip-tube segments have tops which are securely fastened to a cap of the separator in hook like manner by U-shaped angle rails. The adjacent lower ends of the dip-tube segments may also be interconnected by angle rails having U-shaped profiles which serve to protect the lower end of the dip tube from excessive wear caused by the impinging hot gas/solids suspension.

7 Claims, 2 Drawing Sheets

CYCLONE SEPARATOR

TECHNICAL FIELD

This invention relates to a cyclone separator, used for direct heat transfer from the hot off-gases of a rotary kiln/cyclone suspension heat exchanger installation for producing cement clinker from cement raw meal, with tangential supply of gas and raw meal, stock discharge in the lower cyclone region, and having dip tube segments removably suspended from the cyclone cap with releasable fasteners.

BACKGROUND OF THE INVENTION

Installations have been provided for producing cement clinker from cement raw meal which have a rotary kiln and a cyclone suspension heat exchanger with calciner connected upstream of said rotary kiln in the sense of material flow. In the cyclone suspension heat exchanger system, the cement raw meal is preheated by combined cocurrent/countercurrent flow of the hot off-gas of the calcination stage or of the rotary kiln, and the stock material precalcined in the calcination stage is separated from the hot gas in the lowermost cyclone of the cyclone suspension heat exchanger system and fed to the rotary kiln. It is understood that the hot-gas cyclones of the cyclone suspension heat exchanger train, in particular the lowermost cyclone, which comes into contact with hot gas and hot meal at a temperature of for example 700 to 950° C., are subjected to severe mechanical, chemical and thermal loading and thus to severe thermochemical and abrasive wear. This applies in particular to the dip tube intruding into the cyclone separator centrally from above.

In the case of a cyclone separator subjected to these severe loadings it is therefore already known to assemble the dip tube from a plurality of segments and to connect the segments to one another detachably so that, in case of wear, the individual dip-tube segments can be replaced at a relatively low cost in time and labor. The beforementioned prior art features are disclosed in German patent number DE 3228902 C2 issued Feb. 9, 1994 to H. Hercheubach et al for a Cyclone Separator and in German patent number DE 19825206 A1 issued Dec. 9, 1999 to R. Filges et al for a Cyclone Separator. The tops of the dip-tube segments were fashioned in angle shape or hook shape and were suspended from the cyclone cap with the hooks. The hook suspension secured the dip-tube segments against falling downwardly into the cyclone separator in case the radially arranged bolts by which the tops of the topmost row of dip-tube segments are clamped against the cap should come loose as a consequence of wear during the operation of the cyclone separator. From a fabrication standpoint, however, it is costly to form hook-shaped or angle-shaped formed bodies to the dip-tube segment sheets, which are smooth per se, by metalworking and/or welding. There are limits to the casting of metal dip-tube segments in that dip-tube segments, if they are no thicker than approximately 15 mm, can be cast free of inhomogeneities only up to a length of approximately 120 cm. Large hot-gas cyclones, however, require correspondingly large dip tubes in which the individual segments are far more than 120 cm long, and must not be too heavy for reasons of installation. The service life of dip-tube segments in known hot-gas cyclones is furthermore shortened if the lower ends of the dip-tube segments, which intrude freely into the interior of the hot-gas cyclone and are subjected to especially abrasive attack by the impinging hot gas/solids suspension, are not specially protected.

BRIEF SUMMARY OF TH INVENTION

It is an object of the invention to provide, for cement clinker production installations with a cyclone suspension heat exchanger system, a cyclone separator, in particular a hot-gas cyclone, with a segmented dip tube whose dip-tube segments are to be securely fastened, have a long service life, and still be simple to fabricate and install.

This invention provides a segmented dip tube with dip-tube segments which smooth. They are not integrally cast and do not have welded-on hook parts. Thus the dip-tube segments can be easily fabricated from comparatively thin-walled sheet metal. Detachably connected to the top and/or bottom of these smooth surfaced dip-tube segments is an angle rail having a U-shaped profile in cross section. The arms of U-shaped angle rail encompass the top and/or bottom of the dip-tube segments in hook fashion. While the dip-tube segments are made of simple heat-resistant sheet steel, the attached separate angle rails can be made of cast steel.

The separate cast angle rails or hooks are secured by radially extending bolts to the top of the uppermost row of circumferentially juxtaposed dip-tube segments distributed about the dip-tube circumference. Thus the dip-tube segments distributed about the dip-tube circumference are securely fastened to the cyclone cap by separate cast hooks in the shape of angle rails.

The bottoms of the dip-tube segments, which intrude freely into the interior of a hot-gas cyclone and which are especially subjected to wear due to the impinging and deflected hot-gas/solids suspension, are protected against wear by angle rails slid on from below, which have the function of an edge guard.

According to a further feature of the invention, the dip-tube segments can be fashioned as laminates by coating at least the dip-tube segment outer side, against which the abrasive hot gas/solids suspension entering the cyclone separator flows. Preferrably a lattice-shaped metal grid with openings filled with a heat-resistant ceramic material are placed on the radially outer surface of the sheet metal dip tube segment.

BRIEF DESCRIPTION OF THE DRAWINGS

The invention and its further features and advantages are explained in more detail on the basis of an exemplary embodiment illustrated schematically in the Drawings, in which.

DETAILED DESCRIPTION OF THE INVENTION

Figure 1:
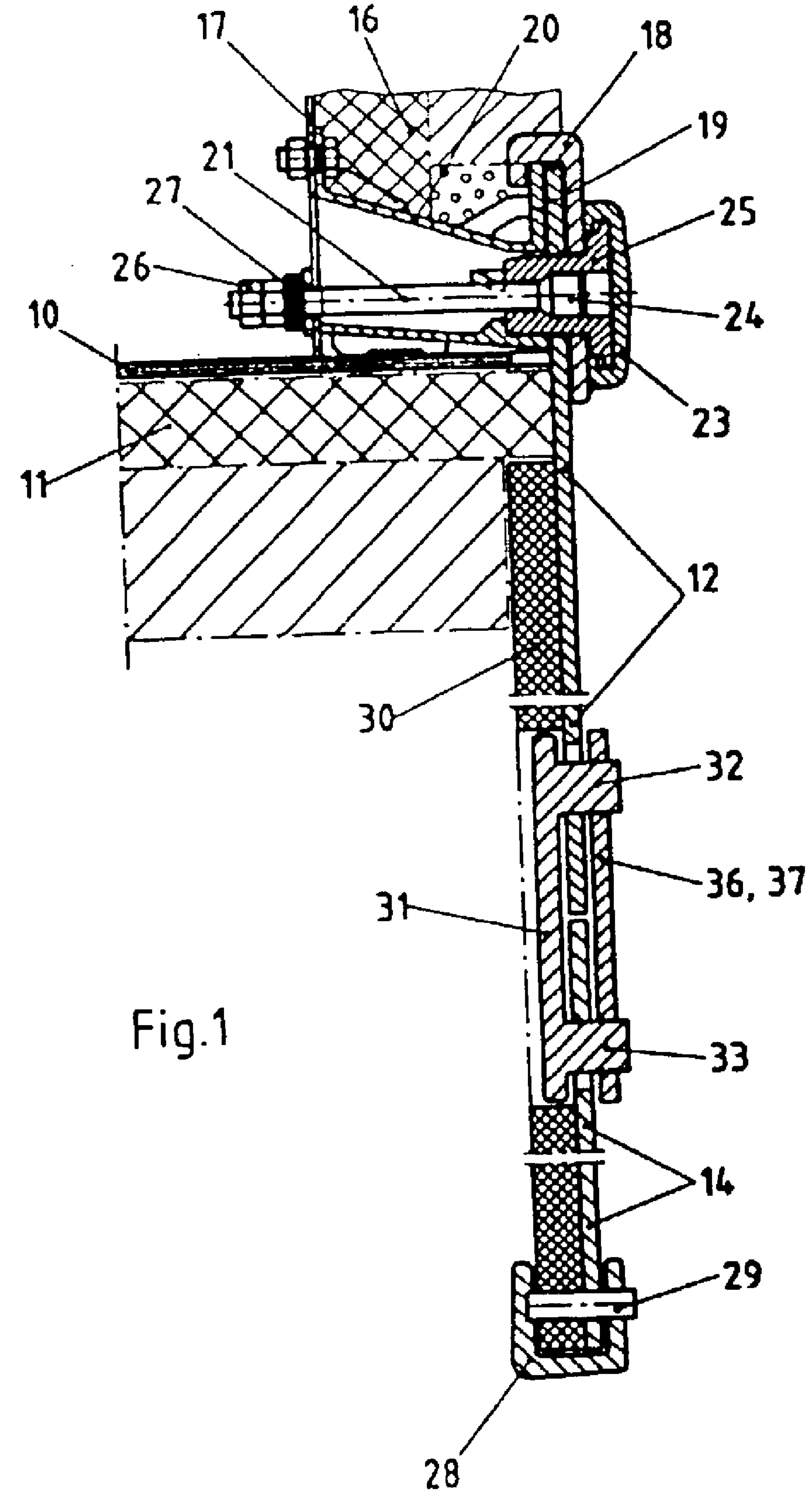
FIG. 1 is a portion of a vertical section through the segmented cyclone dip tube of the invention along line A—A in FIG. 2
Figure 2:
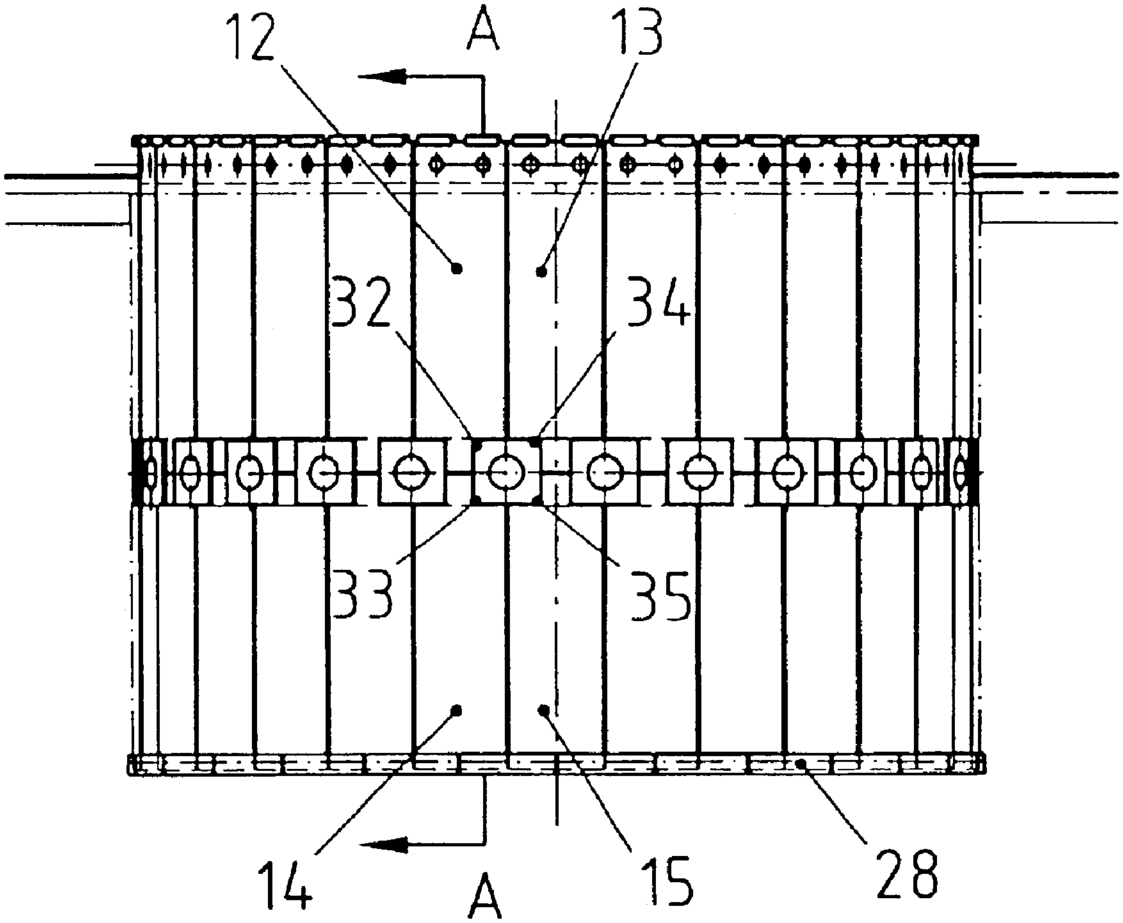
FIG. 2 is a side view in reduced scale of the segmented assembled cyclone dip tube of FIG. 1 as viewed from the right.

The partial section of a cyclone separator shown in FIG. 1 depicts a cyclone cap 10, which is provided with a refractory lining 11 on the inside. In an installation for cement clinker production, hot gas and cement raw meal enter taugentically into the cyclone separator. A dip tube, assembled from a plurality of segments and suspended from the cyclone cap 10, extends into the cyclone separator centrally from above for gas removal. FIG. 2 shows two juxtaposed dip-tube segments 12 and 13 to which further dip-tube segments 14 and 15 are connected to hang therebeneath. An insulated gas extraction pipe 17 is provided with a refractory lining 16 on the inside, and passes upward centrally from the cyclone cap 10.

In principle all of the dip-tube segments 12, 13, 14, 15, etc., are interchangeable and are smooth surfaced on their radially inner and radially outer sides.

Detachably connected to the top row of the top row of dip-tube segments 12, which are smooth per se and made of simple heat-resistant sheet metal, is an angle rail or hook 18 having a U-shaped profile. The arms of the angle rail 18 encompass the top of the top row of dip-tube segments 12, etc., in hook fashion. Angle rail or hook 18 is made as a separate casting. The inner arms of the cast hooks 18 also each encompass the top of a land or flange 19 that extends upwardly from the inside of spacer bushings 20. The spacer bushings 20 are mounted on the cyclone cap 10 in distributed fashion about the dip-tube circumference, and are fastened to the gas extraction pipe 17 and extend approximately radially with respect to the dip-tube center. Arranged in each of the spacer bushings 20 is an approximately radially extending bolt 21 by which the dip-tube segment 12 is detachably connected to the insulated gas extraction pipe 17.

Separate cast hooks 18 in angle-rail shape, which are arranged on the top of the uppermost row of dip-tube segments 12, 13, etc., distributed about the dip-tube circumference, are secured to the inner surfaces of the tops of the dip-tube segment by bolts 21. Each of the heads 24 of bolts 21, which are arranged on the dip-tube inner side in corresponding recesses of dip-tube segments 12, 13, etc., as well as in the spacer bushings 20, is covered by a cover 23, which protects the detachable fastening of the dip-tube segments against the severe thermochemical loading. After its installation, the cover 23 can be further secured to cast hook part 18, etc., by a tack weld. The thickened head 24 of the bolts 21 is fit into a recess of a hood 25 with which the cast hook 18 in angle-rail shape can be clamped to the smooth dip-tube segment 12 which in turn is clamped to the inner side of the spacer bushing 20 or to its inner land 19. On the radially outwardly lying end, the bolts 21 have nuts 26 by which they are secured fastened, via lock washers 27, to the outer circumference of the spacer bushings 20.

The bottoms of the lowermost row of the dip-tube segments 14, 15, etc., circumferentially spaced about the dip-tube circumference are protected against wear by angle rails 28 slid on from below. The angle rails 28 form an edge guard, with its two arms and connecting web enclosing the bottoms of the dip-tube segments. The angle rails 28 are connected to the dip-tube segments by pins 29. As shown in FIG. 2, the angle rails 28 connect the lower ends of adjacent dip-tube segments 14, 15 to each other so that the lower end of the segmented dip tube is stabilized.

According to a further feature of the invention, the dip-tube segments 12, 13, etc., can be fashioned as laminates by coating or covering at least the dip-tube segment radially outer side, against which the abrasive hot-gas/solids suspension entering the cyclone separator flows, in particular in such manner that lands of a lattice-shaped metal grid whose openings are filled with a heat-resistant ceramic material 30 are arranged on the sheet metal segment 12. To guard it, the surface of ceramic material 30 can further have a coating with the lowest possible porosity, in particular a glaze, vitrified coating, enamel, etc.

Referring to FIG. 2, in the crossing joint region where two side-by-side neighboring dip-tube segments 12, 13 and two dip-tube segments arranged 14, 15 therebelow adjoin one another, a retainer plate 31 covering the crossing joint region on one side of the segments is secured by four transverse pins 32, 33, 34, 35 inserted through four corresponding holes in the four adjacent corners of the dip-tube segments. Cross brackets 36, 37 are secured to the four inserted transverse pins 32, 33, 34, 35 to secure the retainer plate 31.

What is claimed is:

1. A cyclone separator of the type used in a cement clinker producing facility in which rotary kiln off gases and raw meal are fed tangentially into the cyclone separator with stock discharged from the lower region of the cyclone separator and having a cap at its upper end defining an opening through which gases are discharged, comprising:

- a vertically extending dip tube for discharging gas from said upper end of said cyclone separator including
  - a plurality of circumferentially juxtaposed and vertically extending dip tube segments forming said dip tube, said dip tube segments having radially inner and radially outer surfaces,
  - a plurality of U-shaped angle rails having downwardly extending arms encompassing the upper ends of dip tube segments in hook like fashion and
  - releasable fasteners securing said U-shaped angle rails and the tops of said dip tube segments to said cap.

2. The cyclone separator of claim 1 wherein said dip-tube segments are made of a heat-resistant sheet metal and said angle rails are made of cast steel.

3. The cyclone separator of claim 1 wherein a lattice-shaped metal grid with openings filled with a heat-resistant ceramic material is placed on said radially outer surface of each of said dip tube segments.

4. The cyclone separator of claim 1 wherein said angle rails are secured, respectively, by bolts (21) to said tops of said dip-tube segments.

5. A cyclone separator of the type used in a cement clinker producing facility in which rotary kiln off gasses and raw meal are fed tangentially into the cyclone separator with stock discharged from the lower region of the cyclone separator and having a cap at its upper end defining an opening through which gases are discharged, comprising:

- a vertically extending dip tube for discharging gas from the top of said cyclone separator including
  - a plurality of circumferentially juxtaposed and vertically extending dip tube segments forming said dip tube, said dip tube segments having radially inner and radially outer surfaces,
  - a first plurality of first U-shaped angle rails having downwardly extending arms encompassing the upper ends of dip tube segments in hook like fashion,
  - releasable fasteners securing said first plurality of U-shaped angle rails and the tops of said dip tube segments to said cap, and
  - a second plurality of U-shaped angle rails having upwardly extending arms encompassing adjacent parts of and releasably secured to the lower ends of adjacent dip tube segments.

6. The cyclone separator of claim 5 wherein a lattice-shaped metal grid with openings filled with heat-resistant ceramic material is placed on the radially outer surface of each of said dip tube segments.

7. A cyclone separator of the type used in a cement clinker producing facility in which rotary kiln off gasses and raw meal are fed tangentially into the cyclone separator with stock discharged from the lower region of the cyclone separator and having a cap at its upper end defining an opening through which gases are discharged, comprising:

- a vertically extending dip tube for discharging gas from the top of said cyclone separator including a plurality of circumferentially juxtaposed and vertically extending dip tube segments forming said dip tube, said dip tube segments having radially inner and radially outer surfaces, releasable fasteners securing the tops of said dip tube segments to said cap, a plurality of U-shaped angle rails having upwardly extending arms encompassing adjacent parts of and releasably secured to the lower ends of adjacent dip tube segments.

* * * * *